Jan. 22, 1963         D. A. RICHARDSON ET AL         3,075,187
ALARM APPARATUS FOR INDUSTRIAL INSTRUMENTATION SYSTEMS
Filed Sept. 15, 1959

INVENTORS
David A. Richardson
Francis J. Ricker
BY
Curtis, Morris & Safford
ATTORNEYS

United States Patent Office 3,075,187
Patented Jan. 22, 1963

3,075,187
ALARM APPARATUS FOR INDUSTRIAL INSTRUMENTATION SYSTEMS
David A. Richardson, Sheldonville, and Francis J. Ricker, Foxboro, Mass., assignors to The Foxboro Company, Foxboro, Mass., a corporation of Massachusetts
Filed Sept. 15, 1959, Ser. No. 840,120
8 Claims. (Cl. 340—213)

This invention relates to industrial instrumentation systems wherein a process condition, such as temperature and the like, is measured, recorded and/or controlled. More in particular, this invention relates to electrical apparatus for automatically providing an "alarm" indication whenever the measured condition deviates more than a predetermined amount from its "set point," i.e. the value at which it is desired to be maintained.

In recent years, there has been a steady growth in the use of electrical instrumentation systems which include remote transmitters for sending to a central station electrical signals corresponding to various measured conditions. Although the electrical signals may be of many different forms, for most purposes it is preferable to transmit a direct-current signal having a magnitude proportional to the measured condition. This D.-C. signal can be fed serially through a plurality of different instruments at the central station, e.g. recorders and controllers, etc., so that each instrument receives exactly the same input signal. Means also can readily be provided to produce a D.-C. "deviation signal" representing the extent to which the measured condition, as reflected by the D.-C. signal, has departed from a desired set-point value; see, for example, U.S. Patent 2,866,108 issued to E. O. Olsen and F. J. Ricker on December 23, 1958.

In such measurement and/or control systems, it frequently is desirable to incorporate automatic alarm apparatus which, by flashing a light or ringing a bell, etc., can alert the operating personnel whenever the measured condition has deviated more than a preset amount from the set point. Because of the need for great precision in controlling present-day industrial processes, such an alarm must be capable of reliable operation within extremely small limits, and particularly it should have a "repeatability" no greater than 1% of the full-scale measurement range. For example, in a temperature measuring system having a full-scale range of 100°, the alarm apparatus should consistently be capable of operation whenever the temperature rises (or falls) to any temperature within 1° of a predetermined temperature.

One approach to this problem is to produce a D.-C. deviation signal (as in the above-mentioned Oslen et al. patent) and feed this signal to a conventional relay which controls an alarm energizing circuit. However, it has been found that presently-available conventional relays are not capable, as a practical matter, of reliable operation within the required tight tolerances when energized by such a D.-C. deviation signal.

This problem has been solved in accordance with the present invention, one embodiment of which is described in detail hereinbelow. Accordingly, it is an object of this invention to provide alarm apparatus, for an industrial instrumentation system, that is superior to such apparatus provided heretofore. It is a further object of this invention to provide such alarm apparatus that is simple and economical to manufacture, and that is capable of reliable operation within very close tolerances. It is a still further object of this invention to provide such apparatus that operates consistently even when subjected to changing ambient temperatures.

Other objects, aspects and advantages of the invention will be in part pointed out in, and in part apparent from, the following description considered together with the accompanying drawing, in which.

Figure 1:
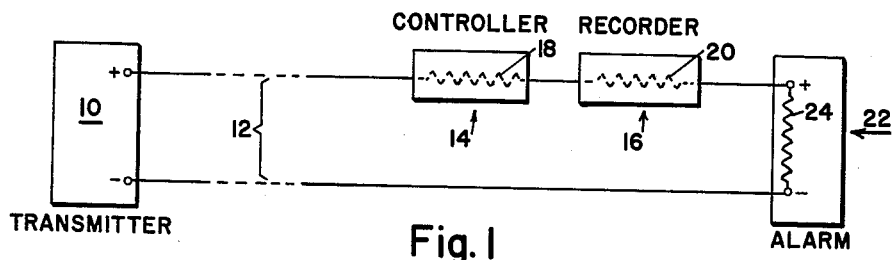
FIGURE 1 is a schematic block diagram showing an instrumentation system incorporating alarm apparatus in accordance with this invention.

Referring now to FIGURE 1 of the drawing, there is shown, in outline form, an industrial instrumentation system including a remote transmitter 10 adapted to produce a D.-C. output current corresponding in magnitude to a condition, e.g. temperature or pressure, being measured. This transmitter may take various forms, for example it may be a force-balance device as shown in U.S. application Ser. No. 810,808, filed by John R. Cressey et al. on May 4, 1959. The D.-C. output of the transmitter is conducted through a two-wire transmission line 12, which may be of substantial length as indicated by the broken lines, and is fed serially to several instruments 14 and 16 normally located in a central control station. The instruments shown in the drawing are identified as a process controller and a measurement recorder, but these are shown only by way of example and other types of instruments might well be used. Each of these instruments is shown as including corresponding resistor elements 18 and 20, merely to indicate the normal input resistance of the electrical circuitry associated with the instruments.

Figure 2:
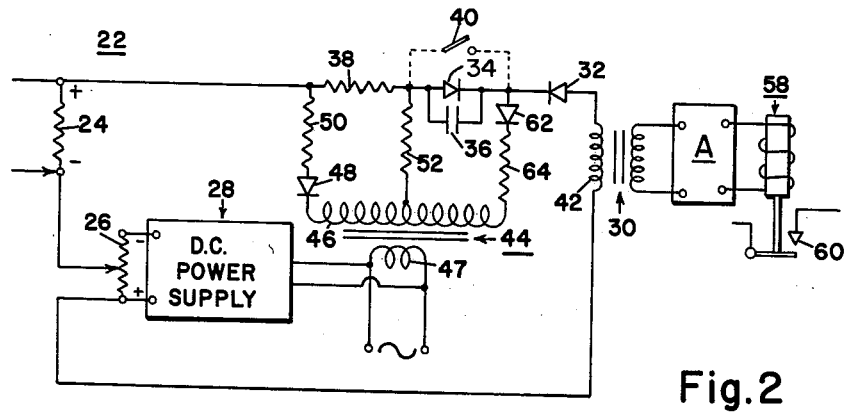
FIGURE 2 is a circuit diagram showing details of the alarm apparatus.

The transmitter output current flows through instruments 14 and 16 and also through an alarm device indicated in block outline at 22. This alarm device, which is shown in detail in FIGURE 2, includes an input resistor 24 adapted to develop a voltage corresponding in magnitude to the D.-C. current produced by the transmitter 10. Resistor 24 is connected in a series circuit which includes a potentiometer 26 energized by a regulated D.-C. power supply generally indicated at 28. The resistor voltage, which may be termed a "measurement signal," is opposed by the potentiometer voltage, which may be termed an "alarm set signal." Any difference in potential between these two signals is applied to the remainder of the series circuit which includes a transformer 30, a diode rectifier 32, a second diode rectifier 34 in parallel with a capacitor 36, and a resistor 38.

Diode 34 and capacitor 36 form part of a temperature-compensating circuit which will be described subsequently. However, to explain the operation of the basic alarm circuit in the most readily-understandable manner, the immediately following discussion is based on the assumption that diode 34 and capacitor 36 are disabled, i.e. that resistor 38 is connected directly to diode 32 as by closing a hypothetical switch indicated in dotted outline at 40.

Diode 32 is polarized to permit current flow through the circuit only when the alarm set signal of potentiometer 26 is greater than the measurement signal of input resistor 24, this current passing through the transformer primary winding 42 and resistor 38. Resistor 38 also is supplied with periodic half-wave current pulses by an energizing circuit including a biasing transformer 44 having a center-tapped secondary 46 and a primary 47. This primary is connected to the usual 60 cycle power means and the secondary is connected to resistor 38 through a diode rectifier 48 and isolating resistors 50, 52. Diode 48 is poled in such a direction that the pulsating bias voltage across resistor 38 opposes the flow of current through diode 32, and therefore the current through diode 32 also will be pulsating.

Figure 3:
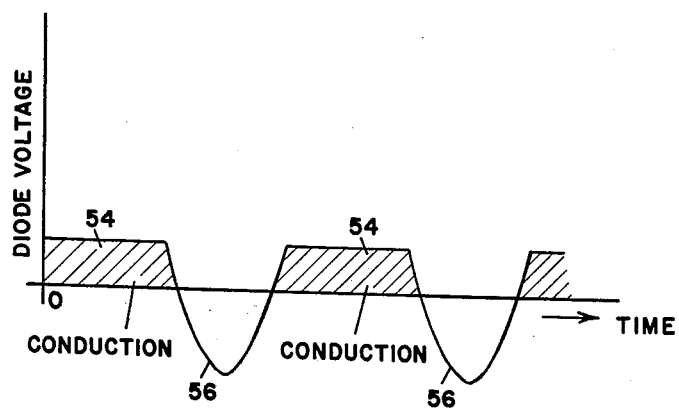
FIGURE 3 is a graph showing the pulsating flow of current through the alarm circuit.

This relationship is shown more clearly in FIGURE 3, which represents the voltage across diode 32 as a function of time. In the situation portrayed by this graph, the measurement signal of resistor 24 is smaller than the alarm set signal of potentiometer 26, and thus diode 32 normally receives a "positive" conducting voltage indicated by the horizontal line 54 over the shaded portions. This positive voltage is, however, periodically modified by a negative half-wave bucking voltage 56 resulting from the pulsating current flowing through resistor 38 from diode 48. This negative voltage has an amplitude considerably greater than the normal positive voltage applied to diode 32, and prevents conduction through this diode for substantially each alternate half-cycle of the A.-C. power wave.

Consequently, it will be apparent that transformer 30 will be energized by a pulsating current whenever the measurement signal of resistor 24 deviates negatively with respect to the alarm set signal of potentiometer 26. The amplitude of this pulsating current will be proportional to the difference between the measurement and set signals. Moreover, because the half-wave bucking voltage 56 is substantially greater than the deviation voltage 54, any small changes in the amplitude of the bucking voltage will not noticeably affect the amplitude of the pulsating signal fed to the transformer 30. Thus, the biasing transformer 44 may be energized directly from the 60 cycle power mains, without requiring any A.-C. voltage-regulating devices.

The pulsating current in transformer 30 is fed to an A.-C. transistor amplifier A the internal circuitry of which is conventional and hence is not shown herein. The output of this amplifier is connected to the winding of a conventional relay 58 having contacts 60 which are connectible to the energizing circuit of an alarm-indicating device such as a bell or the like. Accordingly, whenever the magnitude of the measurement signal at resistor 24 drops significantly below that of the alarm set signal at potentiometer 26, the resulting A.-C. signal fed through amplifier A will actuate relay 58 and thereby sound the alarm.

Returning now to the temperature-compensation circuit mentioned briefly hereinabove, diode 34 and capacitor 36 are energized by bias transformer 44 through another diode rectifier 62 and associated isolating resistors 64 and 52. The voltage produced across diode 34 and capacitor 36 applies to the series circuit, which includes transformer 30, a bias voltage which varies with variations in the temperature of diode 34. Diode 34 is "matched" to diode 32, i.e., these diodes have substantially identical temperature characteristics. If the temperature of these diodes increases, their resistance decreases, and both diodes will tend to conduct more heavily. Diodes 34 and 62 are poled in such a manner that current flow from transformer 44 will charge capacitor 36 in a polarity which will oppose current flow through diode 32. The discharge time of capacitor 36 is long compared with the pulse length, thus maintaining essentially constant voltage across capacitor 36. This voltage is selected by choice of resistors 52 and 64 to be the voltage which is produced across diode 32 at the signal level at which the alarm is activated. Inasmuch as at the time of activation of the alarm, the voltages across diodes 32 and 34 will be essentially identical in magnitude, but opposed in polarity, the tendency of diode 32 to conduct more heavily at higher temperatures will be compensated for by the effect of the corresponding increased conduction through diode 34 due to such higher temperatures.

The temperature compensation circuit may be energized from a direct current power supply instead of by alternating current from bias transformer 44. Also in the temperature compensating circuit a negative temperature coefficient network having suitable temperature characteristics may be used in place of the diode rectifier 34.

It will be evident from the above discussion that, in order to obtain exact compensation for changes in the resistance of diode 32 due to variations in temperature, the values of the elements in the energizing circuit for diode 34 should be relates to the characteristics of diodes 32 and 34. In this regard, satisfactory operation has been obtained with an alarm device wherein resistor 24 was 100 ohms; potentiometer 26 was 1000 ohms; resistor 38 was 2000 ohms; resistors 50, 52 and 64 were 47,000 ohms; diodes 32 and 34 were of the type identified commercially as IN 538; diodes 48 and 62 were of the type identified commercially as IN 538 (N100AA); and capacitor 36 had a capacitance of 50 microfarads.

The alarm device described herein is a low-signal alarm type, i.e. the alarm is sounded if the measurement signal falls significantly below the alarm set signal. However the device can equally well be arranged as a high-signal alarm type, as by reversing the polarities of the various diodes. In many installations, duplex units will be installed to sound the alarm when the measured condition either drops too low or rises too high.

Accordingly, it will be apparent from the above description that the present invention meets the objects set forth herein, and provides a unique alarm device that is superior to prior alarm arrangements. Apparatus constructed in accordance with this invention is simple in construction, accurate and reliable in operation, and well-adapted for use with inexpensive A.-C. amplifiers such as those employing transistors.

Although a specific preferred embodiment of the invention has been set forth in detail, it is desired to emphasize that this is not intended to be exhaustive or necessary limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. In automatically-operable alarm apparatus for use with an industrial condition measurement and/or control system which includes signal-transmission means for transmitting a direct current corresponding in magnitude to the condition being measured and/or controlled; the improvement in said alarm apparatus which comprises: a series electrical circuit including a first circuit element connectible with said signal-transmission means to develop a measurement signal corresponding to the magnitude of the direct current in said signal-transmission means, D.-C. power supply means for producing an alarm set signal oppositely polarized with respect to said measurement signal, rectifier means arranged to permit the flow of current through said series circuit only when a predetermined one of said signals is greater than the other of said signals, and a second circuit element for developing a bias voltage in said series circuit; energizing means coupled to said second circuit element and including means to produce thereacross a periodic pulsating bias voltage polarized to tend periodically to prevent conduction through said series circuit; an A.-C. amplifier coupled to said series circuit to produce an output responsive to the pulsations of current flow through said rectifier means; and alarm control means operable by the output of said A.-C. amplifier.

2. Apparatus as claimed in claim 1, wherein said alarm control means comprises an electrical relay having a pair of contacts connectible to the operating circuit of an alarm indicating device and the like.

3. Apparatus as claimed in claim 1, wherein said first and second circuit elements consist of electrical resistors, said energizing means including a source of alternating current in series with a rectifier to produce half-wave pulses of current through said second circuit element resistor, said half-wave pulses being of sufficient amplitude to prevent conduction through said rectifier means.

4. Apparatus as claimed in claim 1, including temperature-compensating means connected in said series circuit to maintain the flow of current through said rectifier means substantially constant with changes in temperature.

5. Apparatus as claimed in claim 4, wherein said temperature-compensating means comprises a second rectifier means having a temperature characteristic similar to that of said first-mentioned rectifier means, said second rectifier means being oppositely-polarized with respect to said first rectifier means.

6. Apparatus as claimed in claim 5, including a source of current for energizing said second rectified means at a predetermined amplitude, and a by-passing capacitor connected in parallel with said second rectifier means.

7. Alarm apparatus adapted for use with a signal-transmission system wherein a direct current, having a magnitude corresponding to a measured condition, is fed to controlling or recording equipment and the like; said alarm apparatus comprising a circuit element connected to said signal transmission system to develop a D.-C. measurement signal corresponding to the measured condition, a D.-C. power supply connected with said circuit element and arranged to provide an alarm set signal having a polarity opposite to the polarity of said measurement signal, rectifier means connected in series with said circuit element and said D.-C. power supply to permit a flow of current when one of said two signals is greater than the other; impedance means connected in series with said rectifier means, energizing means coupled to said impedance means and including means to apply thereto a pulsed periodic signal which develops across said impedance means a corresponding pulsed bias voltage that is opositely polarized with respect to said rectifier means, whereby said pulsed bias voltage tends periodically to inhibit conduction through said rectifier means; an A.-C. transistor amplifier coupled to said rectifier means to produce an output responsive to the flow of current through said rectifier means, and alarm operating means controlled by the output of said amplifier.

8. In apparatus for use with industrial process condition measurement and/or control systems which include signal-transmission means for conducting a direct current corresponding in magnitude to the condition being measured and/or controlled; the combination of a series electrical circuit including a first circuit element connectible to said signal-transmission means to develop a measurement signal corresponding to said direct current, D.-C. power supply means for producing a set signal in opposition to said measurement signal, rectifier means arranged to permit the flow of current through said series circuit only when a predetermined one of said signals is greater than the other signal, and a second circuit element for developing a bias voltage in said series circuit; energizing means coupled to said second circuit element and including means to produce thereacross a periodic pulsating bias voltage polarized to prevent conduction through said series circuit; amplifier means coupled to said series circuit to produce an output responsive to the pulsations of current flow through said rectifier means; and a load device operable by the output of said amplifier means.

References Cited in the file of this patent
UNITED STATES PATENTS

| 1,883,613 | Devol | Oct. 18, 1932 |
| 2,665,845 | Trent | Jan. 12, 1954 |
| 2,691,727 | Lair | Oct. 12, 1954 |
| 2,719,289 | Barstow | Sept. 27, 1955 |
| 2,779,869 | Gerks | Jan. 29, 1957 |
| 2,883,529 | Marantette | Apr. 21, 1959 |

FOREIGN PATENTS

| 885,721 | Germany | Aug. 6, 1953 |